(No Model.)
H. O. F. BINDEMANN.
ELECTRICAL STEERING APPARATUS.
No. 603,886. Patented May 10, 1898.
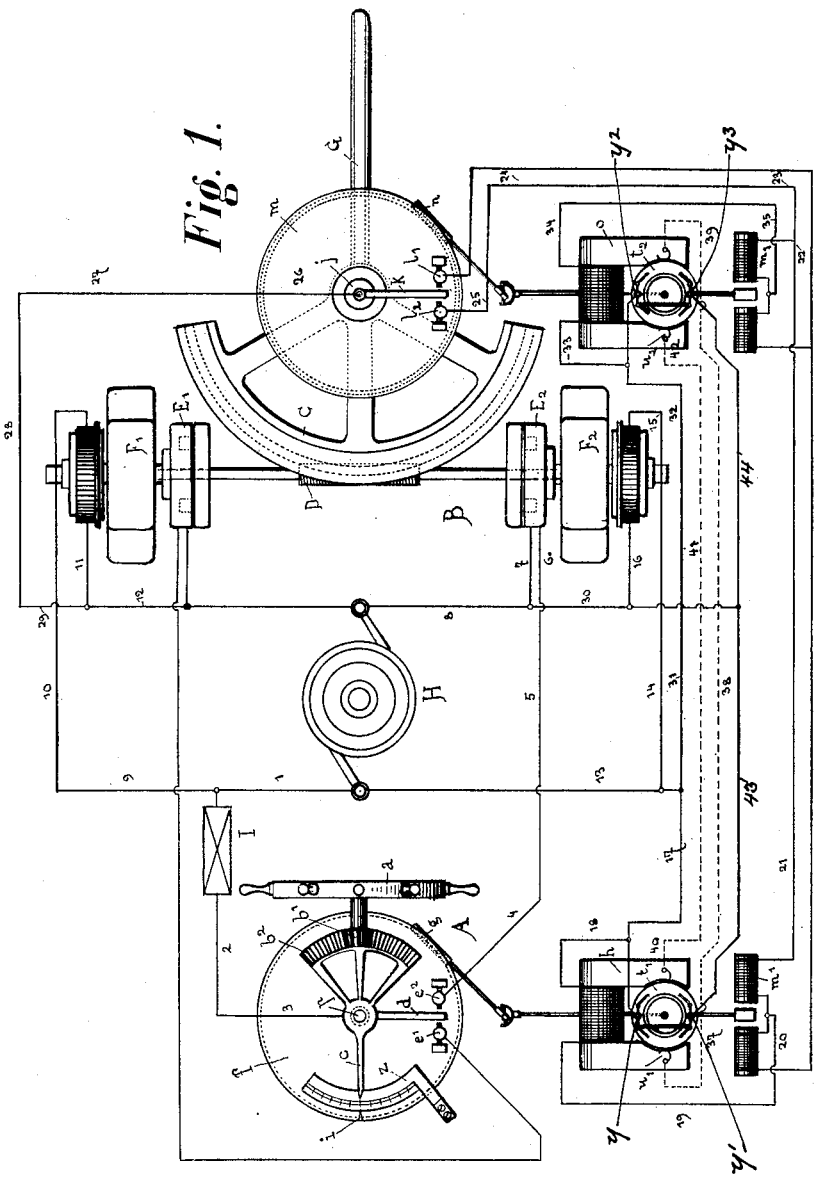
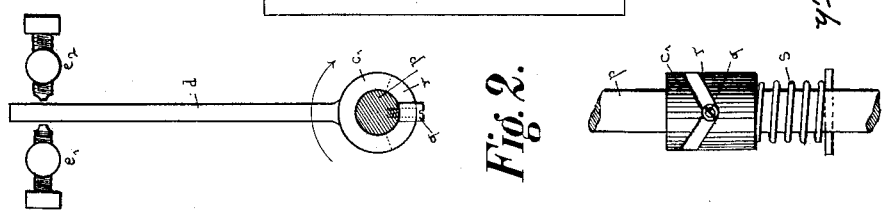
WITNESSES:
Julius Lutz
John Lotka
INVENTOR:
H. O. F. Bindemann
BY
[signature]
ATTORNEYS.

UNITED STATES PATENT OFFICE.

HARRY OTTO FERDINAND BINDEMANN, OF MADRID, SPAIN.

ELECTRICAL STEERING APPARATUS.

SPECIFICATION forming part of Letters Patent No. 603,886, dated May 10, 1898.

Application filed June 4, 1897. Serial No. 639,401. (No model.)

*To all whom it may concern:*

Be it known that I, HARRY OTTO FERDINAND BINDEMANN, a subject of the King of Prussia, and a resident of Madrid, Spain, have invented a new and useful Improvement in Electrical Steering Apparatus with Telltale Appliances, of which the following is a full, clear, and exact description.

The object of my invention is to provide an electrical steering apparatus to be used on ships as a substitute for the steam steering apparatus ordinarily used. The new construction has been devised principally with a view to great simplicity, easy manipulation, cleanly and economical working, and a high degree of safety.

The invention, briefly described, comprises mechanism, such as a worm, controlling the position of the rudder and capable of rotation in either direction in combination with motors arranged to rotate in opposite directions and electrically-controlled clutches for connecting said worm with either of the motors. There is also an actuating device under the control of an attendant for operating said clutches, a contact device operated by the movement of the rudder for automatically closing a circuit when the rudder has taken the desired position, and synchronous motors in said circuit for breaking the circuit of the clutch-actuating device, so that the apparatus will remain stationary after the rudder has come to the desired position.

The invention will be described in detail hereinafter, and the features of the novelty will be pointed out in the claims.

Reference is to be had to the accompanying drawings, forming a part of this specification, in which similar characters of reference indicate corresponding parts in both the figures.

Figure 1 is a diagrammatic plan of the complete apparatus, and Fig. 2 shows the arrangement of the switch-arm of the clutch-operating device in sectional plan and in side elevation.

The apparatus comprises a controlling device A, having a wheel $a$ to be turned by the attendant in the usual manner. The wheel A, by means of a bevel-pinion $b'$, turns a bevel-sector $b^2$, mounted on a pivot $p$ and rigidly connected to a pointer $c$ and also connected to a contact-arm or switch-arm $d$. The switch-arm $d$ is located between contact-pieces $e'\ e^2$, secured to a toothed disk $f$ and insulated from each other. This disk is mounted to turn about the same axis as the sector $b^2$, but independently thereof, being actuated by means of a worm $g$, driven from an auxiliary electric motor $h$. The disk $f$ is provided with an index $i$, which in the normal position registers with the pointer $c$, as shown. Both the index and the pointer are arranged adjacent to a stationary graduated arc $z$, by means of which the man at the wheel is enabled to properly set the apparatus according to the desired position of the rudder. The auxiliary motor $h$ is constructed to rotate in either direction and has two pairs of brushes which may be brought into action alternately by means of an electromagnetic device $m'$, more fully described hereinafter.

The steering apparatus proper, B, consists of a segmental worm-wheel C, secured to the pivot $j$ of the rudder G and meshing with a worm D, which can be connected to either of the electric motors $F'\ F^2$ through the medium of electromagnetic clutches $E'\ E^2$. These motors rotate continuously in opposite directions, so that they will throw the rudder to one side or the other as soon as either of them is coupled to the worm D. The pivot $j$ also carries a contact-arm $k$, arranged to engage insulated contact-pieces $l'\ l^2$, secured to a toothed disk $m$, which is driven from the electric motor $o$ by means of the worm $n$. The contact-arm $k$, contact-pieces $l'\ l^2$, and disk $m$ are the same in construction as the contact-arm $d$, contact-pieces $e'\ e^2$, and disk $f$ of the controlling device A. The motors $o$ and $h$ rotate synchronously, and each of them is capable of rotating in either direction. Assuming the tension at both motor-terminals and besides their dimensions and other constants to be the same, they will rotate synchronously. Of course it may be safer to employ any sort of mechanical or electrical device for maintaining absolute synchronism. A good method of attaining this is shown diagrammatically in Fig. 1. Two parts, situated at one hundred and eighty degrees apart with respect to the armature-coils $t'\ t^2$, are connected to contact rings and brushes $u\ u^2$, and each contact-brush of one motor is connected by a separate circuit 37 38 39 40 41 42 to the respective contact-brush on the other motor. In case of one motor lagging in speed behind the other alternating currents will traverse these circuits 37 38 39 40 41 42, which tend to pull the lagging armature up to speed, or vice versa. It will be understood that there must be a certain definite relation between the speed of the steering-motors F' and F² and that of the auxiliary motors $h$ and $o$. Should the steering-motor rotate too rapidly, the apparatus would work forward and backward till the position of rest is attained. By properly winding the motor-coils and properly proportioning their parts the desired relation of speeds can be readily obtained.

The contact or switch arms $d$ and $k$ are constructed alike, the construction being shown in Fig. 2. The arm $d$, having a sleeve $c'$, is loosely mounted on the pivot $p$, but is normally held in a predetermined position by means of a spring $s$ pressing from below against the sleeve $c'$, which has a V groove or slot $r$, engaged by a pin $q$, projecting from the pivot $p$. When the latter is turned, the switch-arm $d$ moves with it until either the contact-piece $e'$ or its mate $e^2$ engages said arm. The pivot may then continue to turn, but the pin $q$ will slide in the inclined groove $r$, compressing the spring $s$. If said contact-piece yields in the same direction, the arm $d$ will tend to return to its central position at the angle of the V groove, since the sleeve $c'$, under the influence of the spring $s$, will slide up the inclined plane formed by the said groove.

The operation of the apparatus is as follows: The attendant turns the wheel $a$ until the pointer $c$ indicates the desired degree on the fixed graduation. The switch-arm $d$ first moves in unison with the pointer $c$, but comes to a temporary stop after striking, say, the contact-piece $e$. This contact completes an electric circuit from the source of electric current, such as a dynamo H, through the wire 1, resistance I, wire 2 3, switch-arm $d$, contact-piece $e^2$, wire 4 5 6, electromagnetic clutch E², and wire 7 8 back to the dynamo H. The worm D thus becomes coupled to the motor F², which, as hereinbefore stated, continuously rotates in a predetermined direction. The rudder G will therefore be turned in the desired direction. The switch-arm $k$ partakes of this motion until it strikes the contact-piece $l^2$. This closes the circuit for the synchronously-rotating motors $o$ and $h$.

The motors F' F² receive their current from the dynamo H. The two circuits are as follows: For the motor F' the current is supplied through the wires 1 9 10 and 11 12, and for the motor F² through the wires 13 14 15 and 16 30 8. After the circuit for the motors $h o$ has been closed by the arm $k$ engaging the contact-piece $l^2$, as described, said motors rotate synchronously, the magnets $m'$ having been energized. The field-magnet circuits in this case are as follows: Wires 13 17 18, motor $h$, wire 19 20, electromagnet $m'$, conductor 21 22 23 24 25, contact-piece $l^2$, switch-arm $k$, wires 26 27 28 29 8 to dynamo, and for the other motor $o$ from the dynamo through wires 13 31 32 33, motor $o$, wire 34 35, electromagnet $m'$ of the receiving-motor—that is, of the motor connected to the steering apparatus proper—wire 23 24 25, contact-piece $l^2$, switch-arm $k$, and back to dynamo through wires 26 27 28 29 8.

As hereinbefore mentioned, synchronism of the motors $o$ and $h$ is secured by having rotatable conducting-rings connected with the armature-coils $t'$ $t^2$ in contact with brushes $u'$ $u^2$, and connecting each brush of one motor with one of the brushes of the other motor, these two connecting-circuits being indicated at 37 38 39 and 40 41 42, respectively. Alternating currents will pass through these two circuits in case the speeds of the armatures of the motors $h$ and $o$ should vary, and the lagging armature will thus be pulled up to the proper speed, as described. The main armature-circuits are partly the same as the field-magnet circuits hereinbefore explained. In the motor $h$ the main armature-circuit is as follows: wires 13 17, contact-brush $y$, armature, contact-brush $y'$, wires 43, 33, 30, and 8. For the motor $o$ the main armature-circuit would be as follows: wires 13 31, contact-brush $y^2$, armature, contact-brush $y^3$, wires 44, 30, and 8.

The synchronously-rotating motors $h$ and $o$ act as follows, respectively, upon the sending portion of the apparatus—that is, upon the portion connected to the hand-wheel $a$ and upon the receiving portion of the apparatus:

(A.) As regards the sending apparatus: The disk $f$ is rotated by the motor $h$ through the medium of the worm $g$ until the switch-arm $d$, sliding in the groove $r$, under the influence of the spring $s$, is directly under the pointer $c$. This brings the arm $d$ out of engagement with the contact-piece $e^2$ and into a central position between the contact-pieces $e'$ and $e^2$. This breaks the circuit in which the electromagnetic clutch E² is included and causes an instantaneous stoppage of the worm D and of the rudder G. The friction of the segmental wheel C assists in bringing the rudder to a stop.

(B.) As regards the receiving apparatus: The disk $m$ is rotated by the motor $o$ through the medium of the worm $n$, according to the direction in which the rudder turns under the influence of either the motor F' or the motor F². The rotation is arrested when the arm $k$ has been turned through an angle equal to the deflection the rudder G has received. The disk $m$ then continues to rotate slightly beyond said point, so as to bring the arm $k$ out of engagement with the contact-piece $l^2$, thus breaking the circuit which controls the motors $h$ and $o$. The disks $f$ and $m$ then remain stationary. Owing to the synchronous rotation of the motors $h$ and $o$ the index $i$ of the disk $f$ will at the end of the operation stand in alinement with the pointer $c$, thus indicating the proper working of the apparatus.

It will be understood that when the handwheel $a$ is turned in the opposite direction the motor $F'$ will come into play, turning the rudder G accordingly. The contact will then be between $d$ and $e'$ instead of $d$ and $e^2$, and between $k$ and $l'$ instead of $k$ and $l^2$. The working of the various parts will then be exactly analogous to that described above.

For the sake of clearness I have described certain steps or operations as occurring in succession; but it will be understood that the auxiliary motors $h$ and $o$ are started simultaneously and almost immediately after the starting of the main or steering motor $F'$ or $F^2$.

I desire it also to be understood that the gist of my invention is defined in the appended claims, and that modifications within the scope of these claims constitute no departure from the nature of my invention.

Having thus described my invention, I claim as new and desire to secure by Letters Patent—

1. The combination with the rudder, and motors rotating in opposite directions, of electromagnetic clutches for operatively connecting the rudder with either of said motors, a switch-arm under the control of the operator, movable contact devices adapted to coöperate with said switch-arm, electrical connections adapted to form a circuit from said switch-arm and contact devices to the electromagnetic clutches, a switch-arm constructed to move with the rudder, movable contact devices adapted to coöperate with said switch-arm, synchronously-operated motors arranged to move the contact devices of the controlling switch-arm and of the rudder switch-arm, and electrical connections adapted to form a circuit from the rudder switch-arm and either of its contact devices to the said synchronously-operated motors, substantially as described.

2. The combination with the rudder, motors rotating in opposite directions, and clutches for operatively connecting the rudder with either of said motors, of an axle or pivot adapted to be turned by the man at the wheel, a switch-arm capable of a limited rotary movement relatively to said pivot, and having an inclined surface, a pin projecting from the pivot and engaging said inclined surface, a spring for keeping the pin against the inclined surface, contact devices arranged to be engaged by the said switch-arm and electrically connected to the said clutches, and means for holding the rudder stationary after it has reached the desired position, substantially as described.

3. The combination with the rudder, motors rotating in opposite directions, clutches for operatively connecting the rudder with either of said motors, and an actuating device under the control of the operator, for operating one clutch or the other, of a switch-arm capable of a limited rotary movement relatively to the pivot of the rudder and having an inclined surface, a pin projecting from the pivot and engaging said inclined surface, a spring for keeping the pin against the inclined surface, contact devices adapted to be engaged by said switch-arm, synchronously-operated motors in circuit with said contact devices and switch-arms, and operative connections from said motors to move the contact devices and to disconnect the rudder from the clutch-controlled motors, substantially as described.

In witness whereof I hereunto set my hand in presence of two witnesses.

HARRY OTTO FERDINAND BINDEMANN.

Witnesses:
JOAQUIN FRIGUEROS,
ENRIQUE FRIGUEROS.